(12) United States Patent
Matsumoto et al.

(10) Patent No.: US 9,481,851 B2
(45) Date of Patent: Nov. 1, 2016

(54) THERMALLY-CURABLE HEAT-CONDUCTIVE SILICONE GREASE COMPOSITION

(71) Applicant: SHIN-ETSU CHEMICAL CO., LTD., Tokyo (JP)

(72) Inventors: Nobuaki Matsumoto, Annaka (JP); Kunihiro Yamada, Annaka (JP); Kenichi Tsuji, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 14/396,656

(22) PCT Filed: Mar. 15, 2013

(86) PCT No.: PCT/JP2013/057383
§ 371 (c)(1),
(2) Date: Oct. 23, 2014

(87) PCT Pub. No.: WO2013/161436
PCT Pub. Date: Oct. 31, 2013

(65) Prior Publication Data
US 2015/0148273 A1    May 28, 2015

(30) Foreign Application Priority Data

Apr. 24, 2012  (JP) .................................. 2012-098765

(51) Int. Cl.
| | | |
|---|---|---|
| C10M 169/04 | (2006.01) | |
| C10M 107/50 | (2006.01) | |
| C10M 125/26 | (2006.01) | |
| C10M 155/02 | (2006.01) | |
| C08L 83/04 | (2006.01) | |
| C08G 77/12 | (2006.01) | |
| C08G 77/20 | (2006.01) | |
| C08G 77/18 | (2006.01) | |
| C08K 3/22 | (2006.01) | |

(52) U.S. Cl.
CPC ........... *C10M 169/044* (2013.01); *C08L 83/04* (2013.01); *C08G 77/12* (2013.01); *C08G 77/18* (2013.01); *C08G 77/20* (2013.01); *C08K 2003/2227* (2013.01); *C10M 2201/05* (2013.01); *C10M 2201/06* (2013.01); *C10M 2229/041* (2013.01); *C10M 2229/047* (2013.01); *C10M 2229/0435* (2013.01); *C10N 2250/10* (2013.01)

(58) Field of Classification Search
CPC .................... C10M 169/044; C10M 2201/05; C10M 2201/06; C10M 2229/041; C10M 2229/0435; C10M 2229/047; C10N 2250/10; C08L 83/04; C08K 2003/2227; C08G 77/12; C08G 77/18; C08G 77/20

USPC ................. 508/139, 173, 202, 208
See application file for complete search history.

(56) References Cited

U.S. PATENT DOCUMENTS

| | | |
|---|---|---|
| 6,306,957 B1 | 10/2001 | Nakano et al. |
| 6,649,258 B2 | 11/2003 | Yamada et al. |
| 6,818,600 B2 | 11/2004 | Yamada et al. |
| 7,329,706 B2 | 2/2008 | Fukui et al. |

(Continued)

FOREIGN PATENT DOCUMENTS

| | | |
|---|---|---|
| EP | 0 939 115 A1 | 9/1999 |
| EP | 1 878 767 A1 | 1/2008 |

(Continued)

OTHER PUBLICATIONS

International Search Report issued in PCT/JP2013/057383, mailed on Apr. 16, 2013.

(Continued)

*Primary Examiner* — James Goloboy
(74) *Attorney, Agent, or Firm* — Birch, Stewart, Kolasch & Birch, LLP

(57) ABSTRACT

Provided is a thermally-curable heat-conductive silicone grease composition which has a high shape-retaining property in an early stage even when the viscosity of the composition is low (i.e., the composition is easy to apply) in the early stage, and which becomes soft (has low hardness) after being cured. A thermally-curable heat-conductive silicone grease composition comprising, as essential components:

(A) an organopolysiloxane having a viscosity of 100 to 100,000 mPa·s at 25° C. and containing at least one alkenyl group per molecule;
(B) an organopolysiloxane represented by general formula (1)

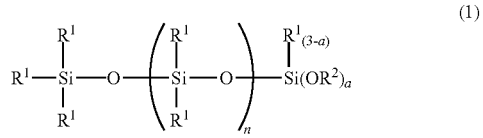

(wherein $R^1$ represents a monovalent hydrocarbon group; $R^2$ represents an alkyl group, an alkoxyalkyl group, an alkenyl group or an acyl group; n represents 2 to 100; and a represents 1 to 3);
(C) an organohydrogenpolysiloxane containing at least two hydrogen atoms each directly bound to a silicon atom per molecule;
(D) a catalyst selected from the group consisting of platinum and platinum compounds;
(F) a heat-conductive filler having a heat conductivity of 10 W/m·° C. or more; and
(G) a silica micropowder.

16 Claims, No Drawings

(56) References Cited

U.S. PATENT DOCUMENTS

| | | | |
|---|---|---|---|
| 8,633,276 B2 | 1/2014 | Domae et al. | |
| 2003/0049466 A1 | 3/2003 | Yamada et al. | |
| 2004/0242762 A1 | 12/2004 | Horikoshi et al. | |
| 2005/0110133 A1 | 5/2005 | Yamada et al. | |
| 2007/0149834 A1 | 6/2007 | Endo et al. | |
| 2008/0213578 A1* | 9/2008 | Endo | C08L 83/04 428/334 |
| 2011/0039738 A1* | 2/2011 | Nakayoshi | C08L 83/04 508/150 |
| 2011/0188213 A1* | 8/2011 | Domae | C08L 83/04 361/748 |
| 2012/0119137 A1 | 5/2012 | Tsuji et al. | |
| 2015/0357261 A1 | 12/2015 | Tsuji et al. | |
| 2016/0060462 A1 | 3/2016 | Kitazawa et al. | |

FOREIGN PATENT DOCUMENTS

| | | |
|---|---|---|
| JP | 61-157569 A | 7/1986 |
| JP | 8-208993 A | 8/1996 |
| JP | 2938428 B1 | 8/1999 |
| JP | 2938429 B1 | 8/1999 |
| JP | 2002-327116 A | 11/2002 |
| JP | 2003-301189 A | 10/2003 |
| JP | 3543663 B2 | 7/2004 |
| JP | 3580366 B2 | 10/2004 |
| JP | 2004-352947 A | 12/2004 |
| JP | 2005-154532 A | 6/2005 |
| JP | 2007-214224 A | 8/2007 |
| JP | 3952184 B2 | 8/2007 |
| JP | 2008-38137 A | 2/2008 |
| JP | 4255287 B2 | 4/2009 |
| JP | 2009-286855 A | 12/2009 |
| JP | 2009-292928 A | 12/2009 |
| JP | 2010-13521 A | 1/2010 |
| JP | 4572243 B2 | 11/2010 |
| JP | 4656340 B2 | 3/2011 |
| JP | 2011-88953 A | 5/2011 |
| JP | 2011-246536 A | 12/2011 |
| JP | 4913874 B2 | 4/2012 |
| JP | 4917380 B2 | 4/2012 |
| JP | 2012-96361 A | 5/2012 |
| JP | 2012-102283 A | 5/2012 |
| JP | 4933094 B2 | 5/2012 |
| JP | 5047505 B2 | 10/2012 |
| JP | 2013-10862 A | 1/2013 |

OTHER PUBLICATIONS

Extended European Search Report issued Nov. 3, 2015, in European Patent Application No. 13780721.0.

Japanese Office Action dated Feb. 10, 2015, for Japanese Application No. 2012-098765.

International Search Report, issued in PCT/JP2013/084211, dated Apr. 8, 2014.

Written Opinion of the International Searching Authority, issued in PCT/JP2013/084211, dated Apr. 8, 2014.

International Preliminary Report on Patentability and Written Opinion of the International Searching Authority dated Nov. 24, 2015, for International Application No. PCT/JP2014/002397.

International Search Report dated Jun. 3, 2014, for International Application No. PCT/JP2014/002397.

Japanese Office Action dated Jan. 12, 2016, for Japanese Application No. 2013-147582.

U.S Office Action dated Jun. 10, 2016, for U.S. Appl. No. 14/759,115.

U.S. Office Action dated Feb. 4, 2016, for U.S. Appl. No. 14/786,676.

U.S. Office Action dated May 23, 2016, for U.S. Appl. No. 14/786,676.

* cited by examiner

THERMALLY-CURABLE HEAT-CONDUCTIVE SILICONE GREASE COMPOSITION

TECHNICAL FIELD

This invention relates to a heat-curable, heat-conductive silicone grease composition which has a low viscosity sufficient to facilitate dispensing and coating and to freely conform to the shape and contour of a heat-generating electronic component, which has good shape retention so that once it is worked into a shape, it may retain the shape unchanged, and which on heat curing, solidifies to a soft state rather than a hard state so that it is sag-controlled when held vertical and applies no extra stresses to the heat source.

BACKGROUND ART

In conjunction with engine control and powertrain systems in transportation vehicles and body systems for controlling air conditioners, the contents of control become more complicated and more systems are necessary for control. Accordingly, the number of electronic control units (ECU) mounted is increasing every year. There is a tendency that the number of electronic components mounted inside is increasing. While a plurality of electronic components and parts of different height generate heat, heat-conductive materials are now requisite to efficiently conduct the heat to casings of die-cast aluminum.

Further, since it is recently required to mount more electronic components and parts within a limited space, their mounting environment (e.g., ambient temperature, humidity, angle, and thickness) is more diversified. In the case of engine ECU, for example, there are more chances of installing electronic components and parts vertically in the engine room. As such, there are more chances of positioning heat-conductive materials vertically in the site where both vibration and high temperature are applied.

While heat-conductive materials are used in such environments, several proposals are made to prevent the heat-conductive material between the heat source and the cooling member from sagging and falling down, for example, use of heat-conductive silicone adhesive materials, heat-conductive potting materials, and room temperature-curable heat-conductive silicone rubber compositions (see JP-A H08-208993, JP-A S61-157569, JP-A 2004-352947, JP 3543663, and JP 4255287: Patent Documents 1 to 5).

However, since all these materials assume a high hardness and bond to substrates, there are drawbacks that they are least re-workable and apply stresses to the heat-generating electronic components. Also, since the heat-conductive material cannot withstand the repeated stresses due to thermal strain, it may separate from the heat-generating component or crack, leading to a rapid increase of thermal resistance.

Under the circumstances, an addition one-part heat-conductive material was discovered (JP-A 2003-301189: Patent Document 6), which has previously undergone heat cross-linking reaction to a high viscosity (to maintain flexibility) during its preparation so that the material is sag-controlled. Since this material is quite flexible despite a high viscosity, its impact of applying stress to the electronic component is weaker than high-hardness materials. Since this material freely deforms and conforms to an irregular surface, it is suitable to apply to electronic components of different height. However, there is the tradeoff as a matter of course, that is, the problem of difficult coating because of high viscosity.

Recently, a heat-conductive silicone composition having a lower viscosity than the addition one-part heat-conductive material was developed (JP-A 2009-286855: Patent Document 7). Its viscosity is still high. There is a desire to have a heat-conductive silicone composition having better workability and sag control.

The above problem is solved by an addition one-part heat-conductive silicone composition (JP-A 2002-327116: Patent Document 8). That is, this composition is readily dispensable prior to heat curing, has a certain degree of re-working even after heat curing, does not sag after curing, remains as a relatively flexible rubber even after curing, and thus plays the role of a stress relaxing agent. Nevertheless, this addition one-part heat-conductive silicone composition still has a problem to be solved. The problem is that as the addition one-part heat-conductive silicone composition is further reduced in viscosity, the composition becomes flowable so that it may spread over the electronic component immediately after dispensing, failing to establish a heat-dissipating passage if a substantial space is defined between the electronic component and the cooling member.

CITATION LIST

Patent Documents

Patent Document 1: JP-A H08-208993
Patent Document 2: JP-A S61-157569
Patent Document 3: JP-A 2004-352947
Patent Document 4: JP 3543663
Patent Document 5: JP 4255287
Patent Document 6: JP-A 2003-301189
Patent Document 7: JP-A 2009-286855
Patent Document 8: JP-A 2002-327116

SUMMARY OF INVENTION

Technical Problem

An object of the invention, which has been made under the above-mentioned circumstances, is to provide a heat-curable, heat-conductive silicone grease composition which has good shape retention despite a low viscosity (or ease of coating) initially and which remains flexible (or has low hardness) after curing.

Solution to Problem

Making extensive investigations to attain the above object, the inventors have found that a heat-curable, heat-conductive silicone grease composition which has an absolute viscosity of 30 to 200 Pa·s at 25° C. as measured by a Malcom viscometer, prior to curing, undergoes a diameter change within 1 mm when the composition is applied onto an aluminum plate so as to form a disk having a diameter of 1 cm (0.5 ml) and held horizontal for 24 hours in a 25° C. environment, and has a hardness of 1 to 60 as measured by an Asker C type rubber Durometer, after curing has good shape retention despite a low viscosity and ease of coating, remains flexible and sag-controlled after curing, and is thus expected to exert stress relaxation and repairable. The invention is predicated on this finding.

Accordingly the invention provides a heat-curable, heat-conductive silicone grease composition as defined below.

[1] A heat-curable, heat-conductive silicone grease composition comprising, as essential components, (A) 100 parts by weight of an organopolysiloxane having a viscosity of 100 to 100,000 mPa·s at 25° C. and containing at least one alkenyl group per molecule, (B) 10 to 900 parts by weight of an organopolysiloxane having the general formula (1):

[Chemical Formula 1]

$$R^1-\underset{\underset{R^1}{|}}{\overset{\overset{R^1}{|}}{Si}}-O-\left(\underset{\underset{R^1}{|}}{\overset{\overset{R^1}{|}}{Si}}-O\right)_n-\underset{}{\overset{\overset{R^1_{(3-a)}}{|}}{Si(OR^2)_a}} \quad (1)$$

wherein $R^1$ is independently a substituted or unsubstituted monovalent hydrocarbon group, $R^2$ is independently an alkyl, alkoxyalkyl, alkenyl or acyl group, n is an integer of 2 to 100, and a is an integer of 1 to 3, (C) an organohydrogenpolysiloxane containing at least two silicon-bonded hydrogen atoms per molecule in such an amount that the number of Si—H groups divided by the number of alkenyl groups in components (A) and (B) may fall in the range from 0.1 to 10.0, (D) a catalyst selected from the group consisting of platinum and platinum compounds in such an amount as to provide 0.1 to 500 ppm of platinum atom based on the weight of component (A), (F) 100 to 20,000 parts by weight of a heat-conductive filler having a thermal conductivity of at least 10 W/m·° C., and (G) 0.1 to 100 parts by weight of finely divided silica.

[2] The heat-curable, heat-conductive silicone grease composition of [1] which has an absolute viscosity of 30 to 200 Pa·s at 25° C. as measured by a Malcom viscometer, prior to curing, undergoes a diameter change within 1 mm when the composition is applied onto an aluminum plate so as to form a disk having a diameter of 1 cm (0.5 ml) and held horizontal for 24 hours in a 25° C. environment, and has a hardness of 1 to 60 as measured by an Asker C type rubber Durometer, after curing.

[3] The heat-curable, heat-conductive silicone grease composition of [1] or [2] wherein the finely divided silica as component (G) is surface-treated fumed silica.

[4] The heat-curable, heat-conductive silicone grease composition of [1], [2] or [3], further comprising (H) 0.1 to 20 parts by weight of a silane coupling agent per 100 parts by weight of component (A).

Advantageous Effects of Invention

The heat-curable, heat-conductive silicone grease composition of the invention has a low viscosity sufficient to facilitate dispensing and coating and to freely conform to the shape and contour of a heat-generating electronic component. It also has good shape retention so that once it is worked into a shape, it may retain the shape unchanged. Further, on heat curing, it solidifies to a soft state rather than a hard state so that it is sag-controlled when held vertical and applies no extra stresses to the heat source. Moreover it is repairable.

DESCRIPTION OF EMBODIMENTS

Now the invention is described in detail.
The invention is directed to a heat-curable, heat-conductive silicone grease composition comprising the following components:

(A) an organopolysiloxane having a viscosity of 100 to 100,000 mPa·s at 25° C. and containing at least one alkenyl group per molecule, (B) an organopolysiloxane having the general formula (1):

[Chemical Formula 2]

$$R^1-\underset{\underset{R^1}{|}}{\overset{\overset{R^1}{|}}{Si}}-O-\left(\underset{\underset{R^1}{|}}{\overset{\overset{R^1}{|}}{Si}}-O\right)_n-\underset{}{\overset{\overset{R^1_{(3-a)}}{|}}{Si(OR^2)_a}} \quad (1)$$

wherein $R^1$ is independently a substituted or unsubstituted monovalent hydrocarbon group, $R^2$ is independently an alkyl, alkoxyalkyl, alkenyl or acyl group, n is an integer of 2 to 100, and a is an integer of 1 to 3, (C) an organohydrogenpolysiloxane containing at least two silicon-bonded hydrogen atoms per molecule, (D) a catalyst selected from the group consisting of platinum and platinum compounds, (F) a heat-conductive filler having a thermal conductivity of at least 10 W/m·° C., and (G) finely divided silica.

Component (A), which is a base polymer in the present composition, is an organopolysiloxane containing at least one alkenyl group per molecule.

The organopolysiloxane as component (A) contains at least one silicon-bonded alkenyl group, preferably at least 2, and more preferably 2 to 3 silicon-bonded alkenyl groups per molecule. Exemplary alkenyl groups include those of 2 to 4 carbon atoms such as vinyl, allyl and butenyl.

Besides the alkenyl group, silicon-bonded organic groups include substituted or unsubstituted, monovalent hydrocarbon groups of 1 to 10 carbon atoms, preferably 1 to 6 carbon atoms, free of aliphatic unsaturation. Examples include straight alkyl, branched alkyl, cyclic alkyl, aryl, aralkyl, and haloalkyl groups. Exemplary straight alkyl groups include methyl, ethyl, propyl, hexyl, and octyl. Exemplary branched alkyl groups include isopropyl, isobutyl, tert-butyl, and 2-ethylhexyl. Exemplary cyclic alkyl groups include cyclopentyl and cyclohexyl. Exemplary aryl groups include phenyl and tolyl. Exemplary aralkyl groups include 2-phenylethyl and 2-methyl-2-phenylethyl. Exemplary haloalkyl groups include 3,3,3-trifluoropropyl, 2-(nonafluorobutyl)ethyl, and 2-(heptadecafluorooctyl)ethyl.

Of the silicon-bonded organic groups in component (A), straight alkyl, alkenyl and aryl groups are preferred, and methyl, vinyl and phenyl are especially preferred.

Component (A) has a viscosity at 25° C. in the range of 100 to 100,000 mPa·s, preferably in the range of 200 to 50,000 mPa·s, more preferably in the range of 300 to 40,000 mPa·s, and even more preferably in the range of 300 to 30,000 mPa·s. A viscosity within the above range ensures that the present composition is easy to handle or work and a cured product of the composition has satisfactory physical properties. Notably, the viscosity is as measured by a rotational viscometer.

The molecular structure of component (A) is not particularly limited. For example, linear, branched, partially branched linear, and dendritic (dendrimer) structures are included, with the linear and partially branched linear structures being preferred. Component (A) may be a homopolymer having such molecular structure, a copolymer having such molecular structure, or a mixture of polymers.

Examples of component (A) include
molecular both end dimethylvinylsiloxy-blocked dimethylpolysiloxane,
molecular both end methylphenylvinylsiloxy-blocked dimethylpolysiloxane,
molecular both end dimethylvinylsiloxy-blocked dimethylsiloxane/methylphenylsiloxane copolymers,
molecular both end dimethylvinylsiloxy-blocked dimethylsiloxane/methylvinylsiloxane copolymers,
molecular both end silanol-blocked dimethylsiloxane/methylvinylsiloxane copolymers,
molecular both end silanol-blocked dimethylsiloxane/methylvinylsiloxane/methylphenylsiloxane copolymers,
molecular both end trimethylsiloxy-blocked dimethylsiloxane/methylvinylsiloxane copolymers,
molecular both end dimethylvinylsiloxy-blocked methyl(3,3,3-trifluoropropyl)polysiloxane, and organosiloxane copolymers consisting of siloxane units of the formula: $(CH_3)_3SiO_{1/2}$, siloxane units of the formula: $(CH_3)_2(CH_2=CH)SiO_{1/2}$, siloxane units of the formula: $CH_3SiO_{3/2}$, and siloxane units of the formula: $(CH_3)_2SiO_{2/2}$.

It is noted that the organopolysiloxane (A) is essentially composed of siloxane skeleton and is free of alkoxy groups.

Component (B) is an organopolysiloxane of the general formula (1), preferably having a viscosity of 5 to 100,000 mPa·s at 25° C.

Component (B) plays the important roles of maintaining the composition as heated at a low hardness and reducing the initial viscosity.

[Chemical Formula 3]

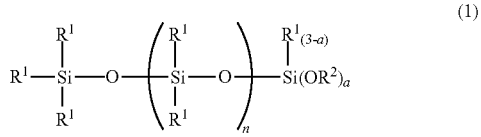

(1)

Herein $R^1$ is independently a substituted or unsubstituted monovalent hydrocarbon group, $R^2$ is independently an alkyl, alkoxyalkyl, alkenyl or acyl group, n is an integer of 2 to 100, and a is an integer of 1 to 3.

In formula (1), $R^1$ is independently a substituted or unsubstituted monovalent hydrocarbon group, preferably of 1 to 10 carbon atoms, more preferably 1 to 6 carbon atoms, and even more preferably 1 to 3 carbon atoms. Examples include straight alkyl, branched alkyl, cyclic alkyl, alkenyl, aryl, aralkyl, and haloalkyl groups. Exemplary straight alkyl groups include methyl, ethyl, propyl, hexyl, and octyl. Exemplary branched alkyl groups include isopropyl, isobutyl, tert-butyl, and 2-ethylhexyl. Exemplary cyclic alkyl groups include cyclopentyl and cyclohexyl. Exemplary alkenyl groups include vinyl and allyl. Exemplary aryl groups include phenyl and tolyl. Exemplary aralkyl groups include 2-phenylethyl and 2-methyl-2-phenylethyl. Exemplary haloalkyl groups include 3,3,3-trifluoropropyl, 2-(nonafluorobutyl)ethyl, and 2-(heptadecafluorooctyl)ethyl. $R^1$ is preferably methyl or phenyl.

$R^2$ is independently an alkyl, alkoxyalkyl, alkenyl or acyl group. Exemplary alkyl groups include straight alkyl, branched alkyl, and cyclic alkyl groups as exemplified for $R^1$. Exemplary alkoxyalkyl groups include methoxyethyl and methoxypropyl. Exemplary alkenyl groups include those exemplified for $R^1$. Exemplary acyl groups include acetyl and octanoyl. Preferably $R^2$ is alkyl, with methyl and ethyl being most preferred.

The subscript n is an integer of 2 to 100, preferably 10 to 50, and a is an integer of 1 to 3, preferably 3.

Typically, component (B) has a viscosity at 25° C. of 5 to 100,000 mPa·s, preferably 5 to 5,000 mPa·s. If the viscosity is less than 5 mPa·s, the resulting silicone grease composition may tend to exert oil bleeding and to sag. If the viscosity exceeds 100,000 mPa·s, the resulting silicone grease composition may lose fluidity and become poor in coating operation. Notably, the viscosity is as measured by a rotational viscometer.

Preferred examples of component (B) are given below.

[Chemical Formula 4]

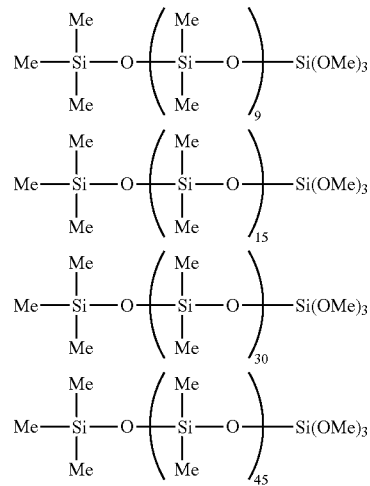

Herein Me stands for methyl.

Component (B) is compounded in an amount of 10 to 900 parts by weight, preferably 20 to 700 parts by weight per 100 parts by weight of component (A). If the amount of component (B) is less than 10 parts by weight, the composition becomes hard, i.e., does not remain flexible, after heating. If the amount of component (B) exceeds 900 parts by weight, the composition becomes uncurable.

Notably, in the practice of the invention, it is acceptable to use an organopolysiloxane free of silicon-bonded alkenyl in addition to the foregoing components (A) and (B). Examples of the additional organopolysiloxane include
molecular both end silanol-blocked dimethylpolysiloxane,
molecular both end silanol-blocked dimethylsiloxane/methylphenylsiloxane copolymers,
molecular both end trimethoxysiloxy-blocked dimethylpolysiloxane,
molecular both end trimethoxysiloxy-blocked dimethylsiloxane/methylphenylsiloxane copolymers,
molecular both end methyldimethoxysiloxy-blocked dimethylpolysiloxane,
molecular both end triethoxysiloxy-blocked dimethylpolysiloxane, molecular both end trimethoxysilylethyl-blocked dimethylpolysiloxane, and
mixtures of two or more of the foregoing.

Component (C) is an organohydrogenpolysiloxane containing at least two silicon-bonded hydrogen atoms per molecule, which serves as a curing agent in the present composition, i.e., which is combined with components (A) and (B) to induce curing.

The number of silicon-bonded hydrogen atoms in this organohydrogenpolysiloxane is at least 2, preferably 2 to 100, and more preferably 2 to 50.

The organohydrogenpolysiloxane contains silicon-bonded groups other than hydrogen, which include substituted or unsubstituted monovalent hydrocarbon groups of 1 to 10 carbon atoms, preferably 1 to 6 carbon atoms, free of aliphatic unsaturation. Suitable monovalent hydrocarbon groups include straight alkyl, branched alkyl, cyclic alkyl, aryl, aralkyl and haloalkyl groups, examples of which are the same as exemplified above for components (A) and (B). The preferred silicon-bonded groups other than hydrogen are straight alkyl and aryl groups, with methyl and phenyl being most preferred.

The viscosity at 25° C. of the organohydrogenpolysiloxane is not particularly limited, and preferably in the range of 1 to 100,000 mPa·s, more preferably 1 to 50,000 mPa·s. A viscosity in the range ensures that the present composition is easy to handle and work, and a cured product of the composition has satisfactory physical properties. Notably, the viscosity is as measured by a rotational viscometer.

The molecular structure of the organohydrogenpolysiloxane is not particularly limited. For example, linear, branched, partially branched linear, and dendritic (dendrimer) structures are included. The organohydrogenpolysiloxane may be a homopolymer having such molecular structure, a copolymer having such molecular structure, or a mixture of polymers. The silicon-bonded hydrogen atom may be positioned at either one or both of molecular terminal position and molecular non-terminal position.

Examples of the organohydrogenpolysiloxane as component (C) include
molecular both end dimethylhydrogensiloxy-blocked dimethylpolysiloxane,
molecular both end trimethylsiloxy-blocked dimethylsiloxane/methylhydrogensiloxane copolymers,
molecular both end dimethylhydrogensiloxy-blocked dimethylsiloxane/methylhydrogensiloxane copolymers,
organosiloxane copolymers consisting of siloxane units of the formula: $(CH_3)_3SiO_{1/2}$, siloxane units of the formula: $(CH_3)_2HSiO_{1/2}$, and siloxane units of the formula: $SiO_{4/2}$, and mixtures of two or more of the foregoing.

Notably, the organohydrogenpolysiloxane is essentially composed of siloxane skeleton and free of alkoxy groups.

The organohydrogenpolysiloxane as component (C) is used such that the amount of silicon-bonded hydrogen atoms (i.e., Si—H groups) in component (C) is 0.1 to 10 moles, preferably 0.1 to 5 moles, and more preferably 0.1 to 3 moles per mole of silicon-bonded alkenyl groups in components (A) and (B). As long as the amount is in the range, the present composition is effectively curable to an adequate hardness, with a minimized likelihood of applying stresses to the heat dissipating component.

Component (D) is a catalyst selected from the group consisting of platinum and platinum compounds, which promotes addition reaction between alkenyl groups in components (A) and (B) and Si—H groups in component (C). Examples of component (D) include platinum alone, chloroplatinic acid, platinum-olefin complexes, platinum-alcohol complexes, and platinum coordinate compounds.

The amount of component (D) used is in a range of 0.1 to 500 ppm, preferably 0.1 to 400 ppm of platinum atom based on the weight of component (A). An amount of less than 0.1 ppm of platinum atom exerts no catalytic effect whereas an amount in excess of 500 ppm exerts no further effect and is uneconomical.

In the practice of the invention, (E) an inhibitor is preferably used for the purpose of suppressing the catalytic activity of component (D). The inhibitor serves to suppress the progress of hydrosilylation reaction at room temperature for thereby prolonging the shelf life and pot life. The inhibitor may be selected from well-known reaction inhibitors. For example, acetylene compounds, nitrogen compounds, and organic phosphorus compounds are useful. Examples include acetylene compounds such as 1-ethynyl-1-cyclohexanol and 3-butyn-1-ol, nitrogen compounds such as triallyl isocyanurate and triallyl isocyanurate derivatives, and organic phosphorus compounds such as triphenylphosphine.

The amount of component (E) used is preferably 0.01 to 1.5 parts, more preferably 0.01 to 1.0 part by weight per 100 parts by weight of component (A). An amount of less than 0.01 part by weight of component (E) may fail to gain a satisfactory shelf life or pot life whereas an amount in excess of 1.5 parts by weight may adversely affect curability.

The inhibitor may be diluted with a solvent such as toluene, prior to use, in order to facilitate its dispersion in the silicone grease composition.

Component (F) is a heat-conductive filler having a thermal conductivity. If the thermal conductivity of the filler is less than 10 W/m·° C., the present composition has a lower thermal conductivity. Thus the filler should have a thermal conductivity of at least 10 W/m·° C., preferably at least 15 W/m·° C.

Suitable heat-conductive fillers include aluminum powder, copper powder, silver powder, nickel powder, gold powder, alumina powder, zinc oxide powder, magnesium oxide powder, aluminum nitride powder, boron nitride powder, silicon nitride powder, diamond powder, and carbon powder. As long as their thermal conductivity is at least 10 W/m·° C., any desired fillers may be used alone or in admixture of two or more.

The average particle size of the heat-conductive filler is preferably in a range of 0.1 to 300 µm, more preferably 0.1 to 200 µm. If the average particle size is less than 0.1 µm, the present composition may not become greasy and lose extensibility. With an average particle size in excess of 300 µm, the present composition may lose uniformity. The shape of the filler may be irregular, spherical or otherwise. Notably the average particle size may be determined, for example, as a weight average value (or median diameter) by the laser light diffraction method.

The amount of the heat-conductive filler loaded is in a range of 100 to 20,000 parts, preferably 500 to 15,000 parts by weight per 100 parts by weight of component (A). Less than 100 parts of the filler fails to gain the desired thermal conductivity. If the amount is more than 20,000 parts, the present composition does not become greasy and loses extensibility.

Component (G) is finely divided silica for imparting shape retention to the composition. As the finely divided silica, surface-treated fumed silica is preferably used. The surface treatment improves the dispersion of silica in components (A), (B) and (C) and enables uniform dispersion.

Also the mutual action of surface-treated fumed silica and the interaction of surface-treated fumed silica and components (A), (B) and (C) impart shape retention.

[Chemical Formula 5]

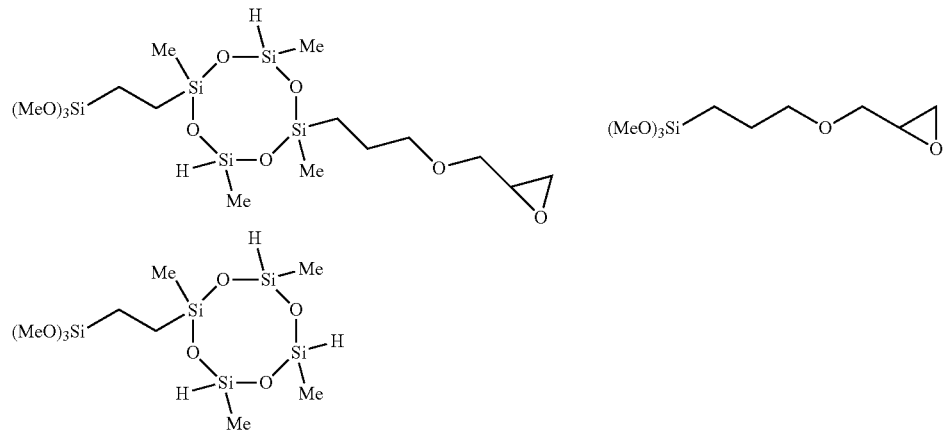

[Chemical Formula 6]

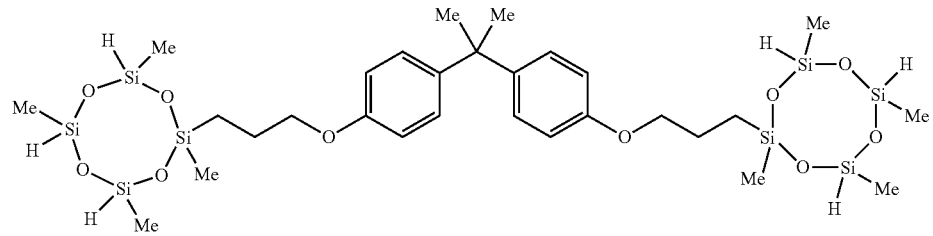

Effective surface treating agents include chlorosilanes, silazanes, and siloxanes. Exemplary of the surface treating agent are methyltrichlorosilane, dimethyldichlorosilane, trimethylchlorosilane, hexamethyldisilazane, octamethylcyclotetrasiloxane, and α,ω-trimethylsilyldimethylpolysiloxane.

Also component (G) should preferably have a specific surface area (BET method) of at least 50 m$^2$/g, more preferably at least 100 m$^2$/g. With a surface area of less than 50 m$^2$/g, the present composition may have too high a viscosity and become awkward to work. The specific surface area (BET method) is preferably up to 500 m$^2$/g, more preferably up to 300 m$^2$/g, because shape retention is enhanced.

The amount of component (G) added is 0.1 to 100 parts, preferably 1 to 80 parts, and more preferably 1 to 60 parts by weight per 100 parts by weight of component (A). With less than 0.1 part of component (G), shape retention is lost. If the amount is more than 100 parts, the composition does not become greasy and loses extensibility.

Besides the above components, any well-known additives may be added to the heat-curable, heat-conductive silicone grease composition insofar as the objects of the invention are not impaired. Suitable additives include, for example, hindered phenol based antioxidants, reinforcing and non-reinforcing fillers such as calcium carbonate, and thixotropic agents such as polyethers. If necessary, colorants such as pigments and dyes may be added.

Also, besides components (A) to (G), adhesion promoters such as silane coupling agents as shown below may be added in order to make the composition bondable to various adherends. Notably, the amount of the adhesion promoter, if used, is preferably 0.1 to 20 parts by weight per 100 parts by weight of component (A).

Herein Me stands for methyl.

The heat-curable, heat-conductive silicone grease composition of the invention may be prepared by mixing the above components by a well-known method until uniform.

The heat-curable, heat-conductive silicone grease composition thus obtained should preferably have an absolute viscosity at 25° C. of 30 to 200 Pa·s, more preferably 30 to 150 Pa·s, as measured by a Malcom viscometer. If the viscosity is less than 30 Pa·s, the dispensability of the composition is too high and not adjustable. If the viscosity exceeds 200 Pa·s, the composition may not be regarded effectively dispensable. Notably the initial viscosity of the heat-curable, heat-conductive silicone grease composition can be set within the range by adjusting the balance of components (A) and (B).

When the heat-curable, heat-conductive silicone grease composition is applied onto an aluminum plate so as to form a disk having a diameter of 1 cm (0.5 ml) and the disk is held horizontal for 24 hours in a 25° C. environment, the composition should preferably undergo a diameter change within 1 mm, especially within 0.5 mm. A diameter change in excess of 1 mm may indicate a shortage of shape retention. In order that the heat-curable, heat-conductive silicone grease composition undergo a diameter change within 1 mm under the above conditions, the amount of component (G) added must be 0.1 to 100 parts by weight per 100 parts by weight of component (A).

Since the heat-curable, heat-conductive silicone grease composition of the invention has a low viscosity at initial, it may deform freely in conformity with the contour (recesses and bosses). Since the composition has shape retention ability, it can retain the shape after deformation. Because of a low viscosity and shape retention ability, even when a heat-generating part is of complex shape, the composition can readily conform to every corner and retain its shape.

Unlike adhesive materials, potting materials and room temperature-curable, heat-conductive silicone rubber compositions, the heat-curable, heat-conductive silicone grease composition of the invention is characterized by curing to a soft or flexible state.

Preferably the heat-curable, heat-conductive silicone grease composition of the invention cures at a temperature of 100° C. to less than 200° C. for a time of 30 to 60 minutes.

It is noted that the heat-curable, heat-conductive silicone grease composition of the invention, after curing, has a hardness of preferably 1 to 60, more preferably 10 to 50, as measured by an Asker C type rubber Durometer. If the hardness is less than the range, the cured composition may be too soft and sag. If the hardness is above the range, the cured composition may be too hard and apply a stress to the heat source. The hardness of the heat-curable, heat-conductive silicone grease composition as cured may be set within the range by adjusting the number of Si—H groups in component (C) divided by the total number of alkenyl groups in components (A) and (B).

Since the heat-curable, heat-conductive silicone grease composition thus obtained remains soft even after curing, it is anti-sagging and effectively repairable, and eliminates any concern of applying substantial stresses to electronic components.

EXAMPLES

Examples and Comparative Examples are given below for illustrating the invention, but the invention is not limited thereto. Examples are shown for the purpose of more clearly demonstrating the superiority of the invention. In the formulae below, Me stands for methyl.

First, the following components were provided.

Component (A)

A-1: dimethylpolysiloxane blocked at both ends with dimethylvinylsilyl and having a viscosity of 600 mPa·s at 25° C.

A-2: dimethylpolysiloxane blocked at both ends with dimethylvinylsilyl and having a viscosity of 30,000 mPa·s at 25° C.

A-3 (comparison): dimethylpolysiloxane blocked at both ends with dimethylvinylsilyl and having a viscosity of 50 mPa·s at 25° C.

A-4 (comparison): dimethylpolysiloxane blocked at both ends with dimethylvinylsilyl and having a viscosity of 110,000 mPa·s at 25° C.

Component (B)

Organopolysiloxane of the Following Formula B-1:

[Chemical Formula 7]

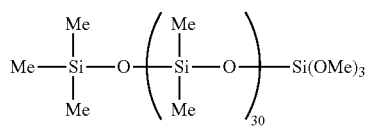

Component (C)

Organohydrogenpolysiloxane of the Following Formula C-1:

[Chemical Formula 8]

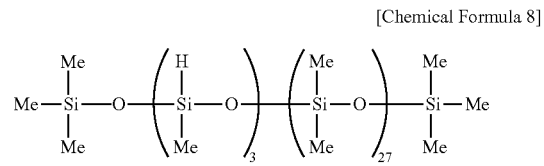

C-2:

[Chemical Formula 9]

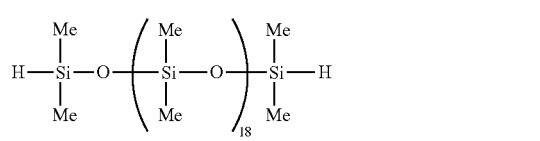

Component (D)

D-1: Solution of Platinum-Divinyltetramethyldisiloxane complex in A-1 (100 ppm by weight of platinum atom)

Component (E)

E-1: 50 wt % Solution of 1-Ethynyl-1-Cyclohexanol in Toluene

Component (F)

F-1 and F-2 were obtained by combining heat-conductive fillers in the mixing ratio shown in Table 1 and agitating at room temperature for 15 minutes on a 5-L gate mixer (trade name: 5-L Planetary Mixer by Inoue Mfg., Inc.). F-3 consisted of zinc oxide powder.

alumina powder with an average particle size of 10 μm (thermal conductivity 27 W/m·° C.)

aluminum powder with an average particle size of 15 μm (thermal conductivity 236 W/m·° C.)

zinc oxide powder with an average particle size of 1.0 μm (thermal conductivity 25 W/m·° C.)

TABLE 1

| Component F | Alumina powder with an average particle size of 10 μm (g) | Aluminum powder with an average particle size of 15 μm (g) | Zinc oxide powder with an average particle size of 1.0 μm (g) |
|---|---|---|---|
| F-1 | 1,500 | 0 | 400 |
| F-2 | 0 | 1,500 | 400 |
| F-3 | 0 | 0 | 400 |

Component (G)

G-1: fumed silica having a BET specific surface area of 120 m²/g and made hydrophobic by surface treatment with dimethyldichlorosilane Component (H)
Adhesion Promoter of the Following Formula H-1:

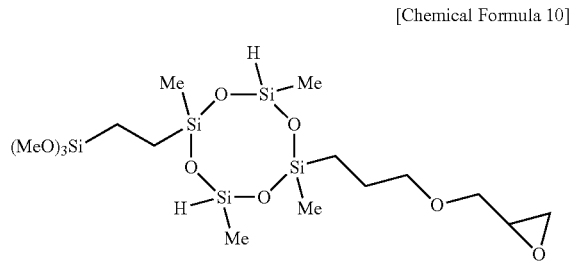

[Chemical Formula 10]

Examples 1 to 4 and Comparative Examples 1 to 5

Compositions of Examples 1 to 4 and Comparative Examples 1 to 5 were prepared by mixing the above components (A) to (H) in the amounts shown in Tables 2 and 3. Specifically, the amounts shown in Tables 2 and 3 of components (A), (B) and (F) were fed into a 5-L gate mixer (trade name: 5-L Planetary Mixer by Inoue Mfg., Inc.) where the contents were deaerated, heated, and mixed at 150° C. for 2 hours. Thereafter, the contents were cooled to room temperature, components (D) and (E) were added thereto, and the contents were mixed at room temperature until uniform. Further, components (G) and (C) were added thereto, and the contents were deaerated and mixed at room temperature until uniform. Optionally, component (H) was added, and the contents were mixed at room temperature until uniform. The compositions thus obtained were evaluated for initial viscosity, cured hardness, thermal conductivity, and shape retention by the following methods. The results are also shown in Tables 2 and 3.

[Initial Viscosity Test]

The initial viscosity of the heat-curable, heat-conductive silicone grease composition is a value at 25° C. as measured by a Malcom viscometer (type PC-10AA).

[Cured Hardness Test]

The heat-curable, heat-conductive silicone grease composition was cured at 100° C. for one hour and cooled, before it was measured for hardness at 25° C. by an Asker C type rubber Durometer.

[Thermal Conductivity Test]

The thermal conductivity of the heat-curable, heat-conductive silicone grease composition prior to curing was measured at 25° C. using a hot disk method thermal property meter TPA-501 (Kyoto Electronics Mfg. Co., Ltd.).

[Shape Retention Test]

In a 25° C. environment, 0.5 ml of the heat-curable, heat-conductive silicone grease composition was applied onto an aluminum plate to form a disk having a diameter of about 1 cm. The disk was held for one day (24 hours) immediately after the completion of application, and measured for its diameter. A change of diameter (mm) was computed and used as an index of shape retention. The less the moving distance, the better is shape retention.

TABLE 2

| Formulation (pbw) | | Example 1 | 2 | 3 | 4 |
|---|---|---|---|---|---|
| Component (A) | A-1 | 100 | 100 | 0 | 100 |
| | A-2 | 0 | 0 | 100 | 0 |
| | A-3 | 0 | 0 | 0 | 0 |
| | A-4 | 0 | 0 | 0 | 0 |
| Component (B) | B-1 | 100 | 100 | 200 | 400 |
| Component (C) | C-1 | 4.6 | 4.6 | 3 | 12 |
| | C-2 | 6.6 | 6.6 | 3 | 8 |
| Si—H/Si—Vi (mol/mol) | | 1.0 | 1.5 | 2.2 | 1.7 |
| Component (D) | D-1 | 0.15 | 0.15 | 0.30 | 0.15 |
| Component (E) | E-1 | 0.45 | 0.45 | 0.45 | 0.45 |
| Component (F) | F-1 | 2,000 | 2,000 | 0 | 0 |
| | F-2 | 0 | 0 | 3,000 | 0 |
| | F-3 | 0 | 0 | 0 | 2,000 |
| Component (G) | G-1 | 11 | 6 | 5 | 50 |
| Component (H) | H-1 | 0 | 1.8 | 0 | 0 |
| Test results | | | | | |
| Initial viscosity (Pa · s) | | 80 | 40 | 100 | 70 |
| Cured hardness | | 10 | 40 | 20 | 25 |
| Thermal conductivity (W/m · ° C.) | | 2.4 | 2.3 | 3.5 | 1.0 |
| Shape retention (mm) | | 0 | 0.5 | 0 | 0 |

TABLE 3

| Formulation (pbw) | | Comparative Example 1 | 2 | 3 | 4 | 5 |
|---|---|---|---|---|---|---|
| Component (A) | A-1 | 0 | 0 | 100 | 100 | 100 |
| | A-2 | 0 | 0 | 0 | 0 | 0 |
| | A-3 | 100 | 0 | 0 | 0 | 0 |
| | A-4 | 0 | 100 | 0 | 0 | 0 |
| Component (B) | B-1 | 100 | 100 | 1,000 | 50 | 100 |
| Component (C) | C-1 | 25 | 1 | 4.6 | 70 | 4.6 |
| | C-2 | 25 | 1 | 6.6 | 70 | 6.6 |
| Si—H/Si—Vi (mol/mol) | | 1.0 | 1.0 | 1.0 | 12 | 1.0 |
| Component (D) | D-1 | 0.15 | 0.15 | 0.15 | 0.15 | 0.15 |
| Component (E) | E-1 | 0.45 | 0.45 | 0.45 | 0.45 | 0.45 |
| Component (F) | F-1 | 2,000 | 2,000 | 10,000 | 0 | 2,000 |
| | F-2 | 0 | 0 | 0 | 2,500 | 0 |
| | F-3 | 0 | 0 | 0 | 0 | 0 |
| Component (G) | G-1 | 10 | 10 | 10 | 10 | 0 |
| Component (H) | H-1 | 0 | 0 | 0 | 0 | 0 |
| Test results | | | | | | |
| Initial viscosity (Pa · s) | | 20 | not greasy | 10 | 30 | 20 |
| Cured hardness | | 90 | unmeasurable | uncured | uncured | 10 |

TABLE 3-continued

|  | Comparative Example | | | | |
| --- | --- | --- | --- | --- | --- |
| Formulation (pbw) | 1 | 2 | 3 | 4 | 5 |
| Thermal conductivity (W/m · ° C.) | 1.8 | unmeasurable | 2.0 | 2.5 | 2.4 |
| Shape retention (mm) | 0 | unmeasurable | 10 | 0 | 20 |

The invention claimed is:

1. A heat-curable, heat-conductive silicone grease composition comprising, as essential components,
(A) 100 parts by weight of an organopolysiloxane having a viscosity of 100 to 100,000 mPa·s at 25° C. and containing at least one alkenyl group per molecule,
(B) based on the weight of component (A), 10 to 900 parts by weight of an organopolysiloxane having the general formula (1):

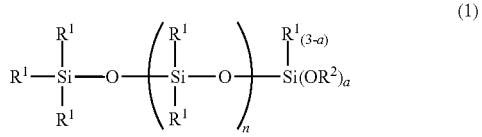

wherein $R^1$ is independently a substituted or unsubstituted monovalent hydrocarbon group, $R^2$ is independently an alkyl, alkoxyalkyl, alkenyl or acyl group, n is an integer of 2 to 100, and a is an integer of 1 to 3,
(C) an organohydrogenpolysiloxane containing at least two silicon-bonded hydrogen atoms per molecule in such an amount that the number of Si—H groups divided by the number of alkenyl groups in components (A) and (B) may fall in the range from 0.1 to 10.0,
(D) a catalyst selected from the group consisting of platinum and platinum compounds in such an amount as to provide 0.1 to 500 ppm of platinum atom based on the weight of component (A),
(F) based on the weight of component (A), 100 to 20,000 parts by weight of a heat-conductive filler having a thermal conductivity of at least 10 W/m·° C.,
(G) based on the weight of component (A), 0.1 to 100 parts by weight of finely divided silica, said finely divided silica being surface-treated fumed silica, and
(H) based on the weight of component (A), 0.1 to 20 parts by weight of a silane coupling agent having one of the following three structural formulas:

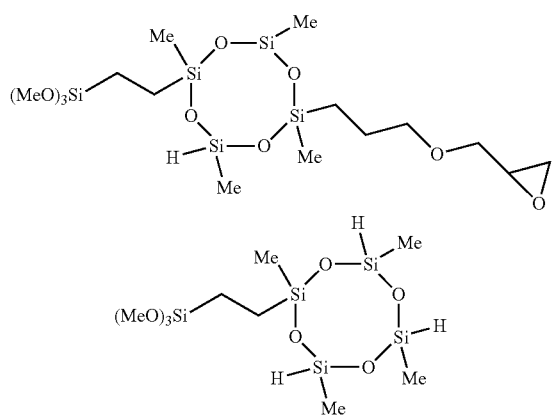

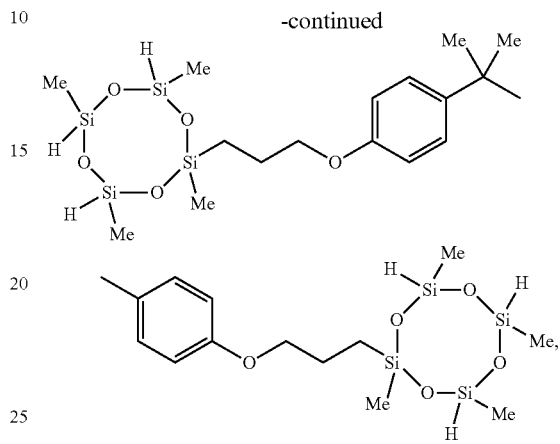

in which formulas the symbol Me designates a methyl group.

2. The heat-curable, heat-conductive silicone grease composition of claim 1 which has an absolute viscosity of 30 to 200 Pa·s at 25° C. as measured by a Malcom viscometer, prior to curing, undergoes a diameter change within 1 mm when the composition is applied onto an aluminum plate so as to form a disk having a diameter of 1 cm (0.5 ml) and held horizontal for 24 hours in a 25° C. environment, and has a hardness of 1 to 60 as measured by an Asker C type rubber Durometer, after curing.

3. The heat-curable, heat-conductive silicone grease composition of claim 1, wherein the surface-treated fumed silica as component (G) has a specific surface area (BET method) of 50 to 500 m²/g.

4. The heat-curable, heat-conductive silicone grease composition of claim 1, wherein surface-treated fumed silica component (G) is surface-treated with a compound selected from the group consisting of
methyltrichlorosilane,
dimethyldichlorosilane,
trimethylchlorosilane,
hexamethyldisilazane,
octamethylcyclotetrasiloxane, and
α,ω-trimethylsilyldimethylpolysiloxane.

5. The heat-curable, heat-conductive silicone grease composition of claim 1, wherein the amount of surface-treated fumed silica component (G) is 11 to 100 parts per 100 parts by weight of component (A).

6. The heat-curable, heat-conductive silicone grease composition of claim 1, further comprising (E), based on the weight of component (A), 0.01 to 1.5 parts by weight of a reaction inhibitor selected from the group consisting of acetylene compounds, nitrogen compounds, and organic phosphorus compounds.

7. The heat-curable, heat-conductive silicone grease composition of claim 6, wherein reaction inhibitor (E) is selected from the group consisting of 1-ethynyl-1-cyclohexanol, 3-butyn-1-ol, triallyl isocyanurate, and triphenylphosphine.

8. The heat-curable, heat-conductive silicone grease composition of claim 1, wherein component (A) is free of alkoxy groups and is selected from the group consisting of
dimethylpolysiloxanes having both ends blocked by dimethylvinylsiloxy moieties,
dimethylpolysiloxanes having both ends blocked by methylphenylvinylsiloxy moieties,
dimethylsiloxane/methylphenylsiloxane copolymers having both ends blocked by dimethylvinylsiloxy moieties,
dimethylsiloxane/methylvinylsiloxane copolymers having both ends blocked by dimethylvinylsiloxy moieties,
dimethylsiloxane/methylvinylsiloxane copolymers having both ends blocked by silanol moieties,
dimethylsiloxane/methylvinylsiloxane/methylphenylsiloxane copolymers having both ends blocked by silanol moieties,
dimethylsiloxane/methylvinylsiloxane copolymers having both ends blocked by trimethylsiloxy moieties,
methyl(3,3,3-trifluoropropyl)polysiloxane having both ends blocked by dimethylvinylsiloxy moieties, and
organosiloxane copolymers consisting of siloxane units of the formula $(CH_3)_3SiO_{1/2}$, siloxane units of the formula $(CH_3)_2(CH_2=CH)SiO_{1/2}$, siloxane units of the formula $CH_3SiO_{3/2}$, and siloxane units of the formula $(CH_3)_2SiO_{2/2}$.

9. The heat-curable, heat-conductive silicone grease composition of claim 1, wherein component (B) is a compound selected from the following:

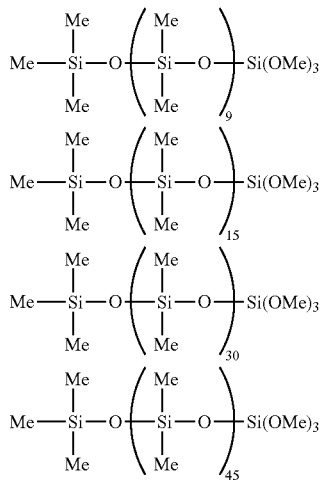

wherein Me designates a methyl group.

10. The heat-curable, heat-conductive silicone grease composition of claim 1, wherein component (C) is free of alkoxy groups and is selected from the group consisting of
dimethylpolysiloxane having both ends blocked by dimethylhydrogensiloxy moieties,
dimethylsiloxane/methylhydrogensiloxane copolymers having both ends blocked by trimethylsiloxy moieties,
dimethylsiloxane/methylhydrogensiloxane copolymers having both ends blocked by dimethylhydrogensiloxy moieties,
organosiloxane copolymers consisting of siloxane units of the formula $(CH_3)_3SiO_{1/2}$, siloxane units of the formula $(CH_3)_2HSiO_{1/2}$, and siloxane units of the formula $SiO_{4/2}$, and mixtures of two or more of the foregoing.

11. The heat-curable, heat-conductive silicone grease composition of claim 1, wherein catalyst component (D) is a member selected from the group consisting of chloroplatinic acid, platinum-olefin complexes, platinum-alcohol complexes, platinum coordinate compounds, and metallic platinum.

12. The heat-curable, heat-conductive silicone grease composition of claim 1, wherein filler component (F) is a compound selected from the group consisting of aluminum powder, copper powder, silver powder, nickel powder, gold powder, alumina powder, zinc oxide powder, magnesium oxide powder, aluminum nitride powder, boron nitride powder, silicon nitride powder, diamond powder, and carbon powder.

13. The heat-curable, heat-conductive silicone grease composition of claim 12, wherein the average particle size of the heat-conductive filler compound ranges from 0.1 μm to 300 μm.

14. The heat-curable, heat-conductive silicone grease composition of claim 1, in which silane coupling agent (H) is the compound having the formula:

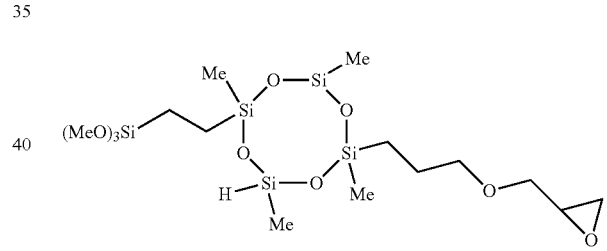

wherein the symbol Me designates a methyl group.

15. The heat-curable, heat-conductive silicone grease composition of claim 1, in which silane coupling agent (H) is the compound having the formula:

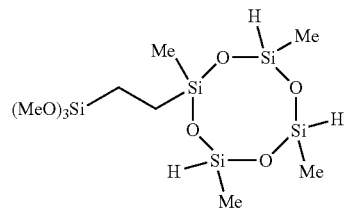

wherein the symbol Me designates a methyl group.

16. The heat-curable, heat-conductive silicone grease composition of claim 1, in which silane coupling agent (H) is the compound having the formula:

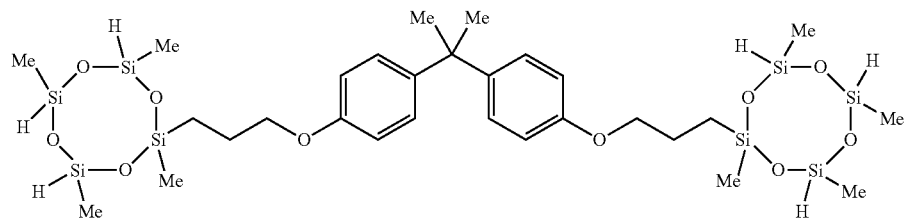 [SMILES: C[SiH]1O[SiH](C)O[Si](C)(CCCOc2ccc(C(C)(C)c3ccc(OCCC[Si]4(C)O[SiH](C)O[SiH](C)O[SiH](C)O4)cc3)cc2)O[SiH](C)O1]
wherein the symbol Me designates a methyl group.
* * * * *